INVENTOR
ALBIN DE LARGE DE MEUX,
BY Bailey Stephens and Huttig
ATTORNEYS

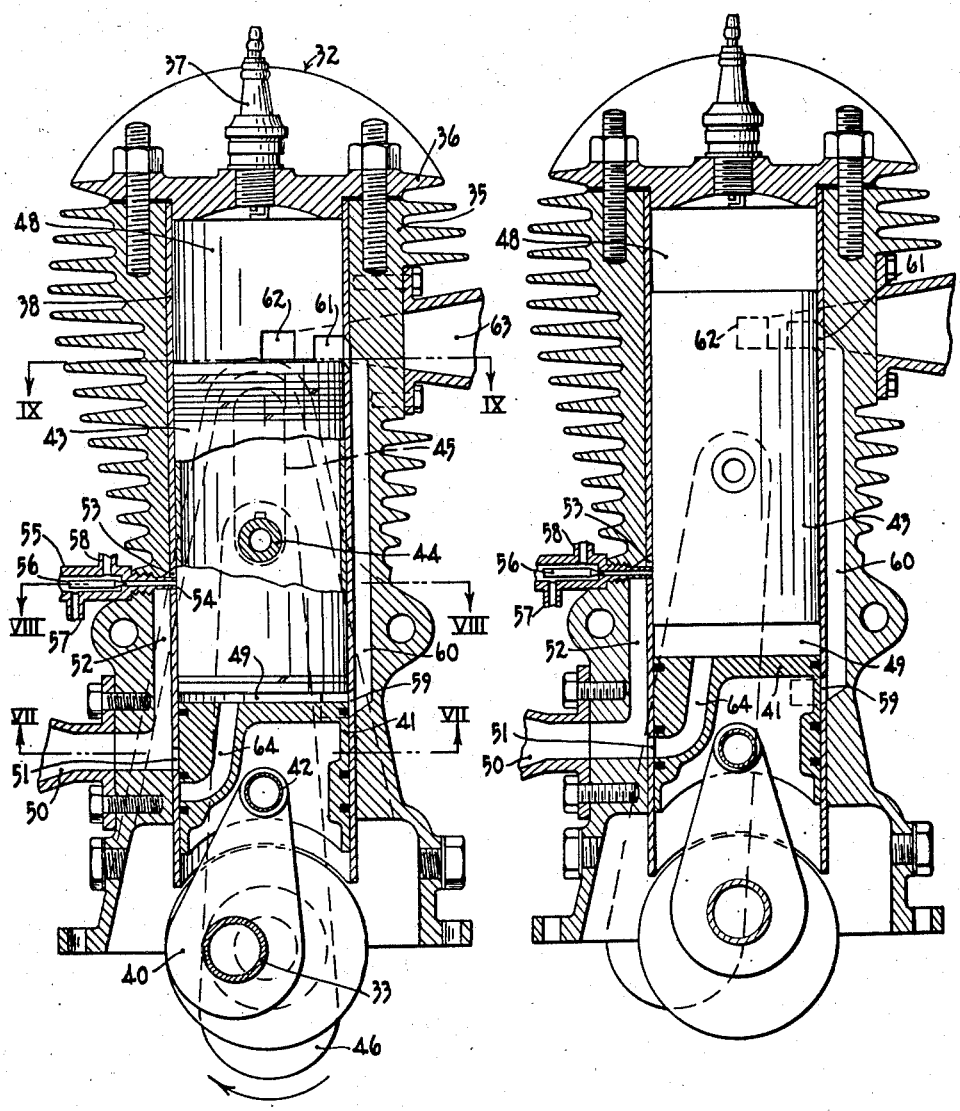

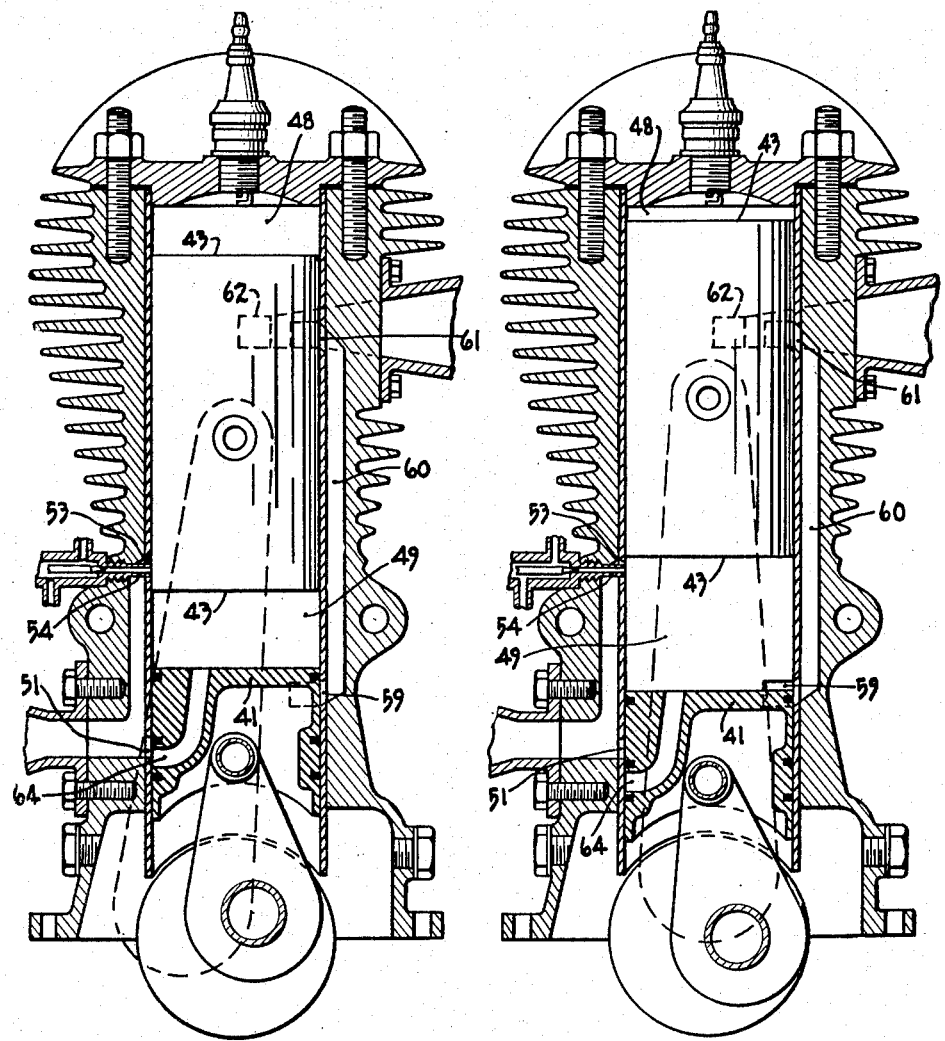

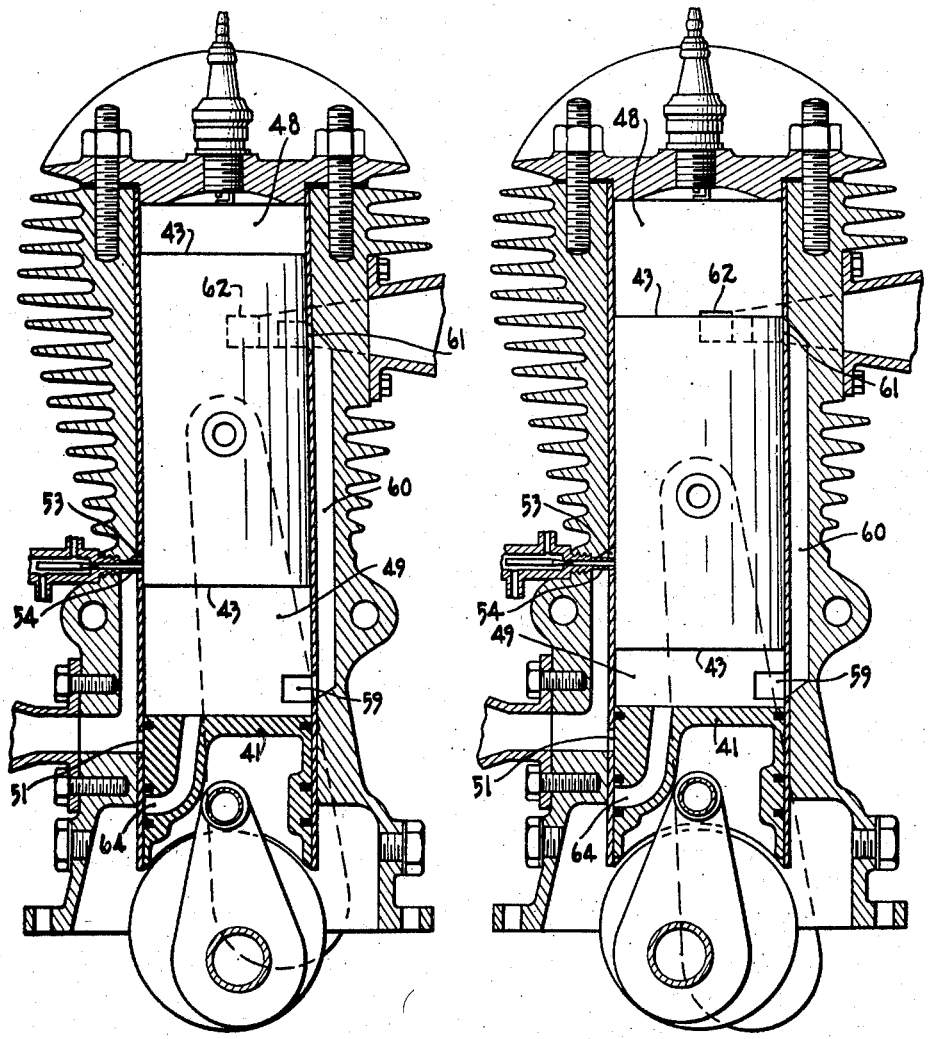

United States Patent Office 2,787,259
Patented Apr. 2, 1957

2,787,259
TWO STROKE CYCLE INTERNAL COMBUSTION ENGINE WITH PUMP AND CYLINDER CO-AXIAL

Albin de Laage de Meux, Montreal, Quebec, Canada

Application July 6, 1954, Serial No. 441,579

Claims priority, application Canada October 13, 1953

7 Claims. (Cl. 123—71)

This invention relates to two-stroke internal combustion engines and particularly to air cooled engines.

The primary object of the invention is the provision of an extremely simple and reliable engine, combining many of the advantages of the diesel type of engine with those of the spark ignition type, whilst at the same time avoiding many of the disadvantages of both types of engine.

One of the main disadvantages of the conventional diesel engine is the high compression ratio that it is necessary to employ, with the attendant requirements of high accuracy in the machined parts. Moreover the cylinder block requires to be built with special reference to the high pressures encountered, and this leads to a generally massive and heavy construction.

Another disadvantage of the conventional diesel engine is the need for a fuel injection system, which in practice has been found to be the part of the engine most subject to faults and thus in need of the most frequent attention.

The engine, which is the subject of the present invention, may be run both as a spark ignition gasoline engine and as a diesel oil engine, the normal procedure being to start the engine on gasoline and then change over to diesel oil and dispense with the spark once a certain cylinder temperature has been reached. It is found that a compression ratio as low as 6 to 1 can be used with entirely satisfactory sparkless ignition once the cylinder has achieved a sufficiently high temperature, say 150° C.

It is one of the most important aspects of the present invention that it provides an engine in which the fuel and air are so thoroughly and satisfactorily mixed in a chamber formed between a pair of pistons reciprocating in each cylinder, that the need for a carburettor (when using gasoline) or a fuel injection pump and injection valves (when using diesel oil) entirely disappears.

These and other important features of the invention are embodied in an engine that will now be described to provide an example of how such features may best be exploited in practice. This engine is illustrated in the accompanying drawings, in which Figure 1 is a central section through one cylinder of the engine transverse to the axis of the crankshaft showing details of the two pistons and the various ports, the main piston being in the bottom dead centre position.

Figures 2 to 6 are views similar to Figure 1, except that the pistons are at different stages in each view and certain of the details already illustrated in Figure 1 are shown only in outline for simplicity.

In Figure 2 the crankshaft has been turned 90° from the Figure 1 position, the secondary piston being at top dead centre.

Figure 3 shows the piston positions about 30° later, and

Figure 4 shows the piston positions after a further 60°, i. e., with the main piston at top dead centre.

Figure 5 shows the circumstances about 60° more advanced during the commencement of the power stroke, and Figure 6 shows the positions of the pistons after the crankshaft has turned through approximately a further 60°, i. e., towards the end of the power stroke. Movement through a further 60° would then bring the parts back to the positions illustrated in Figure 1.

Figure 7:
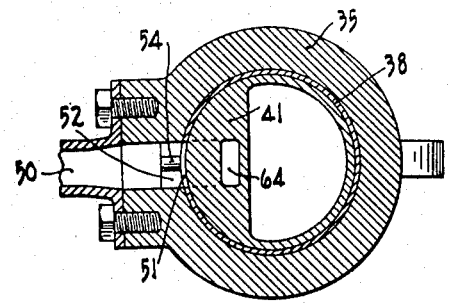
Figure 8:
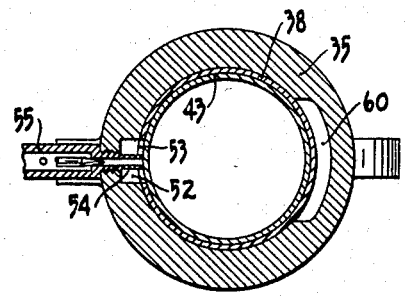

Figure 7 is a cross-section taken on the line VII—VII of Figure 1,

Figure 8 is a cross-section taken on the line VIII—VIII of Figure 1, and

Figure 9:
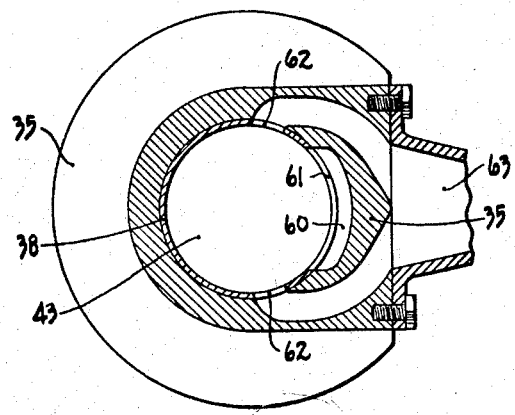

Figure 9 is a cross-section taken on the line IX—IX of Figure 1.

Figure 10:
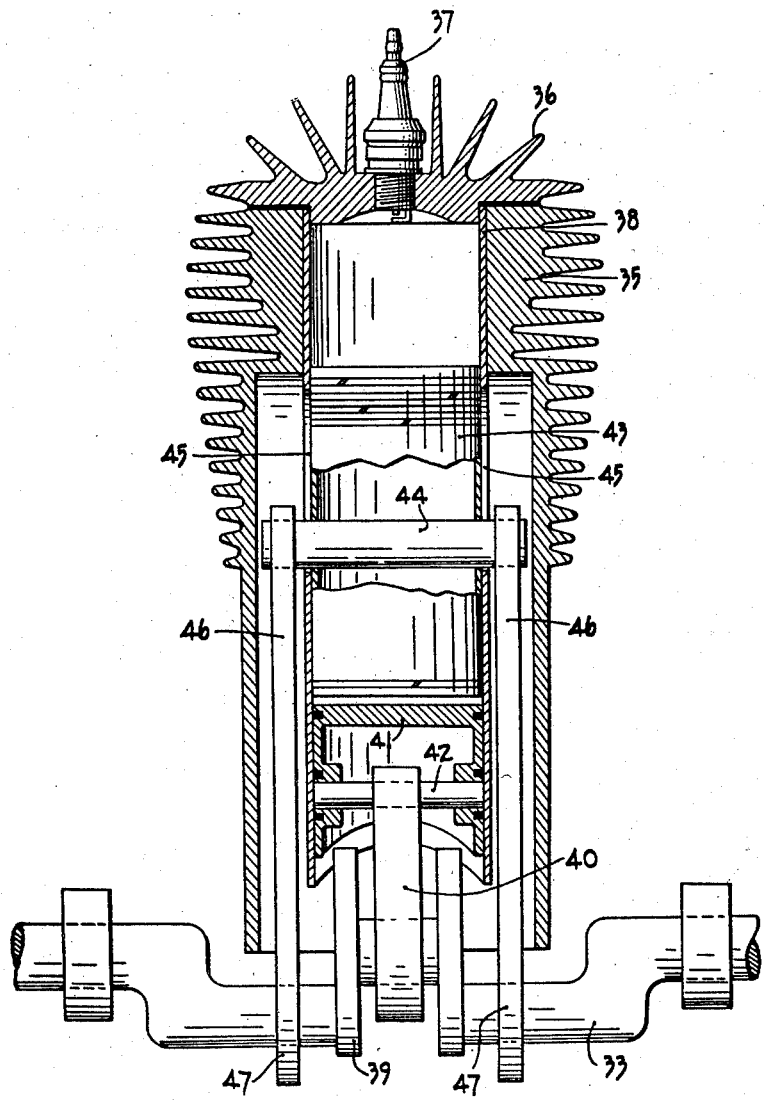
Figure 11:
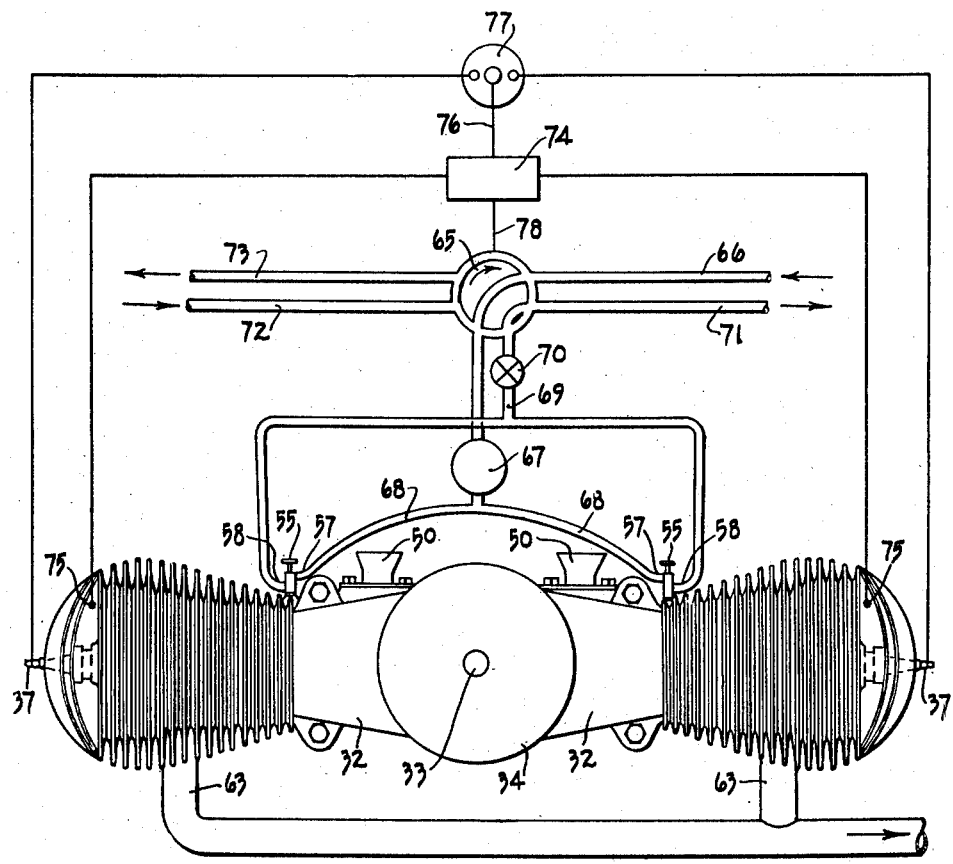

Figure 10 shows a central section of the cylinder seen in Figure 1 but taken on a transverse plane, i. e., a plane in which the main axis of the crankshaft lies, and Figure 11 is a diagrammatic representation of the whole engine, showing the fuel supply system and ancillary parts.

As appears from Figure 11 the engine comprises a pair of opposed cylinders 32 extending in a straight line on each side of a crankshaft 33 bearing a fly-wheel 34. The two cylinders 32 are identical in structure and operation, being connected to the crankshaft to fire alternately. In view of their similarity, only one of the cylinders 32 has been shown in Figures 1 to 6. The details appear particularly from Figure 1, to which reference should now be made, together with the sectional views in Figures 7, 8 and 9 and the side view of Figure 10 as appropriate.

Each cylinder 32 comprises a block 35 with conventional cooling fins, a cylinder head 36 housing a spark plug 37, and a liner 38. The crankshaft 33 has a centrally situated crank arm 39 (Figure 10) carrying the big end of a connecting rod 40. The small end of this connecting rod 40 mounts a piston 41 on a gudgeon pin 42 in the usual manner. This piston 41 is referred to throughout as the secondary piston, since it reciprocates in the cylinder between the crankshaft and the main piston 43. The latter is connected to the crankshaft by means of a gudgeon pin 44 that projects through a pair of slots 45 in the wall of the cylinder (Figure 10) to be connected at each end to the small ends of a pair of connecting rods 46. The big ends of the connecting rods 46 drive the crankshaft 33 by means of crank arms 47 arranged one on each side of the central crank arm 39 connected to the secondary piston 41. In the form of engine being described, the length of the crank arm 39 has been made half that of the crank arms 47. Consequently the stroke of the secondary piston 41 will be half that of the main piston 43. The length of the stroke of the secondary piston 41 is not critical. It is of course desirable to make such length as short as possible—to limit the overall length of the cylinder—compatible with a stroke sufficiently long to cover and uncover properly the various ports with which the piston cooperates, the minimum dimensions of such ports being determined by operational aspects of the engine such as the stroke and bore of the main piston. In practice a stroke for the secondary piston of about half that of the main piston has been found satisfactory.

It will have been observed that the crank arm 39 is shown in the drawings as leading the crank arms 47 (which are of course in phase with each other) by an angle of 90°. It is essential that the secondary piston lead the main piston, but again the amount is not critical. Satisfactory operation can be obtained with the crank arms spaced anywhere within a range of about 65° to about 115°, although the range 70° to 110° is preferred. For each angle there will be a slightly different set of dimensions for the relative positions of the ports etc., and the angle may be chosen with a view to the convenience of such dimensions in any particular set of circumstances. The angle of 90° employed in the engine specifically illustrated, is chosen purely for convenience of illustration and explanation.

The space at the closed end of the cylinder above the main piston 43 constitutes the combustion chamber 48, in the usual way; and the space between the rear of the main piston 43, which is closed off at both ends, and the secondary piston 41 constitutes the "compression" or "mixing" chamber 49.

The air intake conduit is shown at 50 (see also Figure 7) and this conduit supplies air to a first intake port 51 and, through an extension 52, to a second intake port 53 (see also Figure 8). The port 53 surrounds a fuel intake port in the form of a tube 54 leading from a fuel valve 55. This valve has a control spindle 56, a fuel supply pipe 57 and a fuel outlet pipe 58. The purpose and function of these parts will be fully explained below when the operation of the engine is described.

The compression chamber 49 is also in communication (in the Figure 1 position of the pistons) with an outlet port 59 leading to a by-pass passageway 60 formed between a recessed surface of the block 35 and the liner 38. The passageway 60 extends along the cylinder to communicate with an inlet port 61 disposed at the lower end of the combustion chamber 48. This port 61 is also shown in Figure 9, which figure illustrates the position of such port in relation to a pair of exhaust ports 62 arranged on each side of it. The exhaust ports 62 both feed to an exhaust manifold 63. As best seen from Figure 1, the upper edges of the ports 62 are on a level slightly above that of the inlet port 61, so that the exhaust ports will open before the inlet port during the power stroke of the piston.

A passageway 64 extends through the secondary piston 41 from a point on the peripheral wall thereof, aligned circumferentially with the air intake port 51, to a point on the operative face thereof. This passageway 64 thus communicates with the compression chamber 49.

For convenience, the operation of the parts so far described, will now be explained, before consideration is given to the engine as a whole illustrated in Figure 11.

Assuming the pistons to be in the Figure 1 positions, and a charge of explosive gases to be in the combustion chamber 48, the subsequent operation will be as follows: As the crankshaft rotates towards the Figure 2 position, the passageway 64 is brought up into register with the air intake port 51 by the ascent of the secondary piston 41 to its top dead centre position. Simultaneously the main piston 43 is rising and at a greater rate, so that the compression chamber 49 is enlarged. Air is consequently drawn into such chamber from the air intake port 51, and this action continues, since, by the time the crankshaft has turned through another 30° to the Figure 3 position, the volume of the compression chamber 49 has greatly increased, an effect accentuated by the now downward movement of the secondary piston 41. Shortly after the position shown in Figure 3, the downward movement of the secondary piston 41 brings the passageway 64 below the port 51 and thus cuts off this supply of air to the compression chamber. Approximately simultaneously, however, the bottom of the main piston 43 passes beyond the second air intake port 53 so that the supply of air is restored and a quantity of fuel is drawn into the compression chamber 49 from the fuel intake port 54 which lies within the air intake port 53. Figure 4 shows the top dead centre position for the main piston 43, wherein these circumstances apply.

As will be later explained in more detail, the fuel admitted to the compression chamber 49 through the port 54 may be gasoline or it may be diesel oil. In either event it will be in liquid form since it is one of the important features of the invention that there is no carburetion required. Passage through the narrow tube forming the port 54 and the venturi effect of the surrounding moving air will have some effect to atomize or volatilize the fuel, but it may still be liquid to some extent. It is found in practice, however, that the subsequent compression and expansion that the fuel and air in the compression chamber 49 undergo, acts to mix them to an extent entirely satisfactory for ignition in the combustion chamber.

While the events described above have been taking place the charge in the combustion chamber has been compressed. The Figure 4 position shows the end of this compression stroke, the main piston 43 being at top dead centre. At or about this time the charge is ignited, either by the spark plug 37, if operating with gasoline, or by virtue of the temperature of the cylinder and the heat generated by compression of the gases, when operating as a diesel engine. The main piston 43 then commences to move down on its power stroke. The positions of the pistons after about 60° of crankshaft angle can be seen in Figure 5. The air and fuel intake ports 53 and 54 are closed by the main piston 43 and the air intake port 51 remains closed. The outlet port 59 is fully open having been revealed by the secondary piston 41. This port 59 was in fact already slightly open in the Figure 4 position already described, but, as yet, it has no effect beyond allowing the air and fuel mixture to pass into the by-pass passageway 60, since the other end of such passageway is still occluded by the main piston.

In connection with the mixing of the air and fuel referred to in the penultimately preceding paragraph, it should be pointed out at this stage that, although the volume of the compression chamber 49 in the Figure 5 position is about the same as in the Figure 4 position, there will be a condition intermediate between those illustrated in which the compression chamber 49 will be of greater volume, since in the Figure 4 position the secondary piston 41 is moving downwardly with maximum speed whereas the piston 43 is only just commencing to move downwards. This expansion of the compression chamber while the fuel intake port is open, is instrumental in the volatilization of the fuel. The exact time characteristic of the volume of the compression chamber 49 is largely determined by the angle of lead of the secondary piston crank arm 39. To obtain the greatest rate of expansion of the compression chamber 49 during this period, it is necessary to have the secondary piston 41 accelerating rather than decelerating. With the 90° lead angle shown in the drawings the secondary piston 41 will be decelerating slightly (assuming the crankshaft speed to be kept constant by the fly-wheel and other parts connected to it), and for this reason, if this aspect is found to be of dominant significance under any given set of conditions, e. g., type of fuel, bore and stroke of the pistons and intake port characteristics, especially the fuel intake port, then the angle should be reduced. With a lead angle of 70°, the secondary piston will be accelerating for about 20° after the main piston leaves the top dead centre position, and the maximum rate of increase of volume of the compression chamber 49 will be obtained. For this reason an angle of about 70° will often be found desirable, although, as pointed out above, the exact value of this angle is not at all critical.

Returning now to the description of the movement of the pistons, the next stage in the cycle is illustrated in Figure 6. Here the top of the main piston 43 has just begun to uncover the exhaust ports 62 thus allowing the high pressure gases to escape from the combustion chamber 48. Shortly afterwards, the downward movement of the main piston 43 also uncovers the inlet port 61. By this time the volume of the compression chamber 49 has been greatly reduced by the descending main piston, so that the fresh charge of mixed fuel and air has been compressed in the compression chamber 49 and by-pass passageway 60. Consequently this fresh charge escapes rapidly into the combustion chamber when the port 61 is uncovered and helps to expel the spent gases of the previous cycle. This action is aided by the angle of inclination of the port 61 and the end of the passageway 60 immediately behind such port. This angle is about 45° to the axial line of the cylinder, and consequently the fresh charge of gas is projected forcibly into the remote corner of the combustion chamber, i. e., the top left hand corner as seen in Figures 1 to 6, without becoming mixed with the spent gases of the previous cycle. This fresh charge is then reflected from the cylinder walls and head and advances more slowly back across the combustion chamber and downwardly on each side of the central leftwardly moving fast stream of gas, thus pushing the spent gases out of the two exhaust ports 62 arranged on each side of the inlet port 61.

Finally, the two pistons very nearly touch (when the crankshaft reaches a position a few degrees later than that shown in Figure 1) so as to ensure that all the fuel and air mixture is forced up into the combustion chamber. A few more crankshaft degrees later, the secondary piston 41 closes the outlet port 59 so that the next expansion of the compression chamber 49 does not draw any of such mixture back from the combustion chamber 48. At about the same time the ports 61 and 62 are closed by the main piston, the fresh charge is compressed and the cycle of events already described is repeated.

Consideration will now be given to the engine as a whole and its mode of operation. For this purpose reference should be had to Figure 11 in which the engine is shown as having a pair of opposed cylinders 32, each being of the type already described. The fuel supply to the valves 55 passes through a selector 65. In the position shown this selector connects a supply conduit 66 extending from a gasoline tank (not shown) to the fuel pump 67. From this pump the gasoline is fed along conduit 68 to the supply pipe 57 of each valve 55. A proportion of such gasoline enters the compression chambers 49 and the remainder flows out of the outlet pipes 58 to a return conduit 69. A control valve 70 is arranged in this return conduit 69 and the returned fuel passes through this control valve to the selector 65 and finally to a further conduit 71 which drains into the gasoline tank. A similar pair of supply and drainage conduits 72 and 73 connect the selector 65 and a diesel oil tank. By rotating the selector clockwise as seen in Figure 11, these conduits 72 and 73 can be connected respectively to the conduits 68 and 69, so that diesel oil travels over the same circuit as that previously traversed by the gasoline.

Although the individual fuel valves 55 can be employed to control the flow of fuel into each cylinder, it is preferred to set the spindles of these valves permanently in a predetermined position, and to employ the control valve 70 as the throttle. By moving this control valve 70 towards its closed position, the back pressure in the fuel outlet pipes 58 of each valve will be increased. Consequently the pump 67 will force more fuel through the tubes 54 of such valves and the engine will gain speed. Conversely, by opening the control valve 70, more fuel is allowed to escape back to whichever tank is in use and this is equivalent to a comparatively closed throttle. This method of control is found advantageous in enabling satisfactory dual operation with a single control valve. It is equally suited, of course, to multiple control, if the engine were to have more than two cylinders. The individual valves 55 will normally be set by the manufacturer or mechanic and their setting not changed by the user.

The change-over from gasoline to diesel oil is effected by a temperature controlled switching device 74. This device has not been illustrated in detail because its exact construction is of no importance to the present invention. Essentially this device 74 consists of means for determining the inner temperatures of the two cylinders 32, and means for changing over the selector 65 from gasoline to diesel oil, or vice versa, in accordance with such temperatures. As shown, the temperature sensitive means include a pair of thermocouples 75 embedded at convenient points in the cylinders 32. The device 74 may be set to switch the selector 65 over from gasoline to diesel oil when the temperature of both cylinders 32 has reached 150° C. for example, and to reverse the process if either temperature drops below this figure. Simultaneously, the device 74 will be arranged to control the supply of voltage to a lead 76 extending to a distributor 77 which in turn supplies the two spark plugs 37. When the selector 65 is supplying gasoline, the distributor 77 will be energized; when diesel oil is in use, the distributor will be disconnected. The connection between the switching device 74 and the selector 65 is illustrated simply by a single line 78 in Figure 11.

Throughout the foregoing description, emphasis has been placed on the use of the engine with gasoline or diesel oil because these are usually the most cheaply and readily available fuels. It should be mentioned, however, that the engine has been found suitable for operation with any of the fuels commonly employed in internal combustion engines, such as alcohol, or an initially gaseous fuel that will form an explosive mixture with air, such as coal gas, acetylene. In all cases the essential feature of the invention will be retained in that the air and the fuel will be admitted into the compression chamber in separate streams through individual ports. There is the further possibility, however, that only the active ingredient of the air, i. e., oxygen, could be used. For example hydrogen and oxygen could be mixed in a ratio of about 2 to 1 in the compression chamber.

The present application is a continuation-in-part of my application Serial No. 391,690, filed November 12, 1953, now abandoned.

I claim:

1. A two-stroke internal combustion engine, comprising, a crankshaft, a cylinder closed at the end remote from such crankshaft, a main piston connected to the crankshaft so as to be reciprocal in said cylinder at the closed end thereof whereby to define a combustion chamber, a spark plug in said combustion chamber, a secondary piston connected to the crankshaft with a crank arm substantially less than the crank arm of the main piston and so as to be reciprocal in said cylinder between the main piston and the crankshaft whereby to define a mixing chamber between said pistons, the secondary piston being connected to the crankshaft so as to lead the main piston by an angle lying in the range of approximately 70° to approximately 110°, a passageway extending through the secondary piston from the periphery thereof to the operative face thereof remote from the crankshaft, an air intake port to the mixing chamber so situated in the cylinder as to register with the passageway through the secondary piston in the vicinity of the top dead centre position of the latter, a fuel intake port to the mixing chamber so situated in the cylinder as to be uncovered by the main piston in the vicinity of the top dead centre position of the latter, an outlet port from the mixing chamber so situated in the cylinder as to be uncovered by the secondary piston in the vicinity of the bottom dead centre position of the latter, an exhaust port from the combustion chamber so situated in the cylinder as to be uncovered by the main piston in the vicinity of the bottom dead centre position of the latter, an inlet port to the combustion chamber so situated in the cylinder as to be uncovered by the main piston in the vicinity of the bottom dead centre position but over a somewhat smaller angle than that over which the exhaust port is uncovered, and a by-pass passageway connecting the outlet port from the mixing chamber to the inlet port to the combustion chamber.

2. An engine according to claim 1, including a second air intake port situated in the cylinder closely adjacent the fuel intake port, so that the passage of air through said air intake port will tend to draw fuel through said fuel intake port.

3. A two-stroke internal combustion engine comprising a crankshaft, a cylinder closed at the end remote from said crankshaft, a main piston connected to the crankshaft so as to be reciprocal in said cylinder at the closed end thereof whereby to define a combustion chamber, a second piston connected to the crankshaft so as to be reciprocal in the said cylinder between the main piston and the crankshaft whereby to define a mixing chamber between said pistons, the secondary piston being connected to the crankshaft so as to lead but not wholly oppose the main piston, a by-pass passageway extending between said mixing chamber and said combustion chamber, a first air intake port arranged for communication with said mixing chamber and to be covered and uncovered by said secondary piston, a second air intake port arranged for communication with said mixing chamber and to be covered and uncovered by said main piston, a fuel intake port arranged for communication with said mixing chamber, a fuel tank, and an airtight fuel supply conduit extending from said fuel tank to said fuel intake port.

4. An engine according to claim 3, wherein said second air intake port surrounds said fuel intake port so that passage of air through said air intake port will tend to draw fuel through said fuel intake port.

5. A two-stroke internal combustion engine comprising a crankshaft, a cylinder closed at the end remote from said crankshaft, a main piston connected to the crankshaft so as to be reciprocal in said cylinder at the closed end thereof whereby to define a combustion chamber, a second piston connected to the crankshaft so as to be reciprocal in the said cylinder between the main piston and the crankshaft whereby to define a mixing chamber between said pistons, the secondary piston being connected to the crankshaft so as to lead but not wholly oppose the main piston, a by-pass passageway extending between said mixing chamber and said combustion chamber, a first air intake port so situated in said cylinder as to be in communication with said mixing chamber only when said secondary piston is in the vicinity of its top dead centre position, a second air intake port so situated in said cylinder as to be in communication with said mixing chamber only when said main piston is in the vicinity of its top dead centre position, a fuel intake port arranged for communication with said mixing chamber, a fuel tank, and an airtight fuel supply conduit extending from said fuel tank to said fuel intake port.

6. An engine according to claim 5, wherein said second air intake port surrounds said fuel intake port so that passage of air through said air intake port will tend to draw fuel through said fuel intake port.

7. A two-stroke internal combustion engine comprising a crankshaft, a cylinder closed at the end remote from said crankshaft, a main piston connected to the crankshaft so as to be reciprocal in said cylinder at the closed end thereof whereby to define a combustion chamber, a second piston connected to the crankshaft so as to be reciprocal in the said cylinder between the main piston and the crankshaft whereby to define a mixing chamber between said pistons, the secondary piston being connected to the crankshaft so as to lead but not wholly oppose the main piston, a by-pass passageway extending between said mixing chamber and said combustion chamber, an air intake port arranged for communication with said mixing chamber, a fuel intake port arranged for communication with said mixing chamber, a fuel tank, and an airtight fuel supply conduit extending from said fuel tank to said fuel intake port, wherein said secondary piston includes a passageway communicating at one end with said mixing chamber and arranged at the other end to pass in and out of register with said air intake port.

References Cited in the file of this patent

UNITED STATES PATENTS

| | | |
|---|---|---|
| 1,130,934 | Sandell | Mar. 9, 1915 |
| 1,180,740 | Reinhart | Apr. 25, 1916 |
| 1,479,953 | Bray | Jan. 8, 1924 |
| 1,725,274 | Hosford et al. | Aug. 20, 1929 |
| 1,776,871 | Thurber | Sept. 30, 1930 |
| 1,845,596 | Goinard | Feb. 16, 1932 |
| 2,054,413 | Fisher et al. | Sept. 15, 1936 |
| 2,243,594 | De Voe et al. | May 27, 1941 |
| 2,586,621 | De Laage | Feb. 19, 1952 |

FOREIGN PATENTS

| | | |
|---|---|---|
| 657,881 | France | May 28, 1929 |